(12) United States Patent
Christian et al.

(10) Patent No.: US 6,696,184 B1
(45) Date of Patent: Feb. 24, 2004

(54) SUPPORTED TUNGSTEN CARBIDE MATERIAL

(75) Inventors: Joel B. Christian, Towanda, PA (US); Tuan A. Dang, Sayre, PA (US); Robert G. Mendenhall, Waverly, NY (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 09/675,771

(22) Filed: Sep. 29, 2000

(51) Int. Cl.$^7$ ................................................. B32B 9/00
(52) U.S. Cl. ........................ 428/698; 428/408; 428/323
(58) Field of Search ................... 428/698, 408, 428/701

(56) References Cited

U.S. PATENT DOCUMENTS

| | | | |
|---|---|---|---|
| 3,077,385 A | 2/1963 | Robb | 23/208 |
| 3,848,062 A | 11/1974 | Steiger et al. | 423/440 |
| 3,902,917 A | 9/1975 | Baresel et al. | 136/86 |
| 3,943,005 A | 3/1976 | Mund | 136/120 |
| 4,325,843 A | 4/1982 | Slaugh et al. | 252/443 |
| 4,664,899 A * | 5/1987 | Kimmel et al. | |
| 4,702,784 A | 10/1987 | Naoumidis et al. | 156/89 |
| 4,990,372 A | 2/1991 | Sunder et al. | 427/237 |
| 5,277,987 A * | 1/1994 | Garg et al. | 428/698 |
| 5,945,231 A | 8/1999 | Narayanan et al. | 429/30 |
| 5,993,506 A * | 11/1999 | Kobayashi et al. | 75/240 |

OTHER PUBLICATIONS

Voorhies, Electrochemical and Chemical Corrosion of Tungsten Carbide (WC), *J. Electrochem. Soc.*, vol. 119, n. 2, pp. 219–222 no month (1972).
Binder et al., Tungsten Carbide electrodes for Fuel Cells with Acid Electrolytes, *Nature*, 224, 1299–1300 (1969) no month.
Binder et al., Behavior of Tungsten Carbide in Electrodes for Fuel Cells with Acidic Electrolytes, *Energy Conversion*, 10, 25–28 (1970) no month.
J.B. Claridge et al., New Catalysts for the Conversion of Methane to Synthesis Gas: Molybdenum and Tungsten Carbide, *J. Catalysis*, 180, 85–100 (1998).

\* cited by examiner

*Primary Examiner*—Archene Turner
(74) *Attorney, Agent, or Firm*—Robert F. Clark

(57) ABSTRACT

A supported tungsten carbide material is provided. The material has a unique structure as defined by its x-ray diffraction pattern and consists of extremely small crystallites on the order of about 15 to about 30 angstroms in size. The tungsten carbide material is supported on a high-surface-area support to allow for a greater number of active sites for catalysis. The support consists preferably of a high-surface-area carbon.

10 Claims, 4 Drawing Sheets

SUPPORTED TUNGSTEN CARBIDE MATERIAL

CROSS REFERENCES TO RELATED APPLICATIONS

This application is related to application Ser. No. 09/675,510 filed concurrently herewith which is incorporated herein by reference.

TECHNICAL FIELD

This invention relates to tungsten carbides and methods of making same. More particularly, this invention relates to tungsten carbide catalysts.

BACKGROUND ART

High-surface-area tungsten and molybdenum carbide materials are known to possess catalytic properties similar to ruthenium, iridium, palladium and platinum. For example, high-surface-area tungsten and molybdenum carbides have been described as highly efficient catalysts for the conversion of methane to synthesis gas via steam reforming and dry reforming, and for water-gas shift reactions. Like platinum, palladium and ruthenium, tungsten carbide is also known to catalyze the oxidation of hydrogen gas at room temperature which makes it a potential catalyst for low-temperature fuel cell applications such as the PEM (polymer electrolyte membrane), sulfuric acid, and direct methanol types of fuel cells. The $W_2C$ form has been reported as being more catalytically active than the WC form in some applications.

The abundance and relatively low cost of the starting materials used to produce these carbides makes them attractive replacements for the rarer and more costly platinum metals. The main difficulty with metal carbides has been obtaining materials with sufficiently high surface areas. A high surface area is desirable for increasing the number of available catalytic sites. Original studies of preparing high-surface-area carbides used methane and hydrogen flowing over tungsten metal powder or oxides. Further improvements for tungsten and molybdenum carbides were seen in a two-step nitride-carbide formation using ammonia followed by methane. A later advancement in the art found that using ethane as a carburizing gas produced a similar effect in a one step process for molybdenum and tungsten carbides. Other attempts at producing a high specific surface included using organic intermediates. Metal carbides with surface areas as high as 200 $m^2/g$ have now been reported. Other applications for high-surface-area tungsten carbides include biomedical electrodes, e.g., electrodes for pacemakers.

SUMMARY OF THE INVENTION

It is an object of the invention to obviate the disadvantages of the prior art.

It is another object of the invention to provide a supported tungsten carbide material.

It is a further object of the invention to provide a method for forming a supported tungsten carbide material.

In accordance with one object of the invention, there is provided a supported tungsten carbide material comprising a high-surface-area support and a tungsten carbide material. The high-surface-area support is comprised of carbon or alumina. The tungsten carbide is present on the surface of the high-surface-area support and comprises tungsten and carbon. The tungsten carbide material has an x-ray diffraction pattern containing a primary x-ray diffraction peak and first and second secondary x-ray diffraction peaks; the primary x-ray diffraction peak has a reflection angle corresponding to a d-spacing of 2.39±0.02 Å; the first secondary x-ray diffraction peak has a reflection angle corresponding to a d-spacing of 1.496±0.007 Å and a relative peak height of 25% to 40% of the peak height of the primary x-ray diffraction peak; and the second secondary x-ray diffraction peak has a reflection angle corresponding to a d-spacing of 1.268±0.005 Å and a relative peak height of 35% to 55% of the peak height of the primary x-ray diffraction peak.

In accordance with another object of the invention, there is provided a method for forming a supported tungsten carbide material. The method comprises forming a mixture of a tungsten precursor and a high-surface area support and heating the mixture to a temperature from about 500° C. to about 800° C. in an atmosphere containing a hydrocarbon gas and, optionally, hydrogen gas for a time sufficient to convert the tungsten precursor to the tungsten carbide material.

In another aspect of the invention, the method comprises forming an aqueous solution of ammonium metatungstate, mixing the solution with a high-surface-area support, adjusting the pH of the solution to promote the formation of ammonium paratungstate, allowing the solution to set to form crystals of ammonium paratungstate, separating the solid material from the solution, and drying the solids to form a mixture of ammonium paratungstate and a high-surface area support. The mixture is then heated to a temperature from about 500° C. to about 800° C. in an atmosphere containing a hydrocarbon gas and, optionally, hydrogen gas for a time sufficient to convert the tungsten precursor to the tungsten carbide material.

DESCRIPTION OF THE PREFERRED EMBODIMENTS

For a better understanding of the present invention, together with other and further objects, advantages and capabilities thereof, reference is made to the following disclosure and appended claims taken in conjunction with the above-described drawings.

The supported tungsten carbide material of this invention is formed in situ on a high-surface-area support. The support allows a nanodisperse array of crystallites to be arranged on the support yielding a greater number of active sites for catalysis. The preferred support is a high-surface-area carbon such as carbon black or activated carbon. Preferably, the high-surface-area support has a surface area of at least about 50 $m^2/g$ and more preferably from about 100 $m^2/g$ to about 1000 $m^2/g$. The tungsten carbide material formed on the support has a composition which may be represented by the general formula $WC_{1-x}$ where x is from 0 to 0.5. The x-ray diffraction (XRD) pattern of the tungsten carbide material on a carbon support is exemplified in FIG. 1 (Cu $K\alpha_1$ radiation, 1.5405 Å). The XRD pattern indicates that the tungsten carbide material has a face centered cubic lattice. The broad diffraction peaks are consistent with the presence of extremely small crystallites. According to the Scherrer relationship, the peak widths correspond to crystallites in the range of about 15 Å to about 30 Å. This is a major improvement over previously reported crystallite sizes of 275 to 385 Å. The lowest angle peak C is associated with the carbon substrate.

Figure 2:
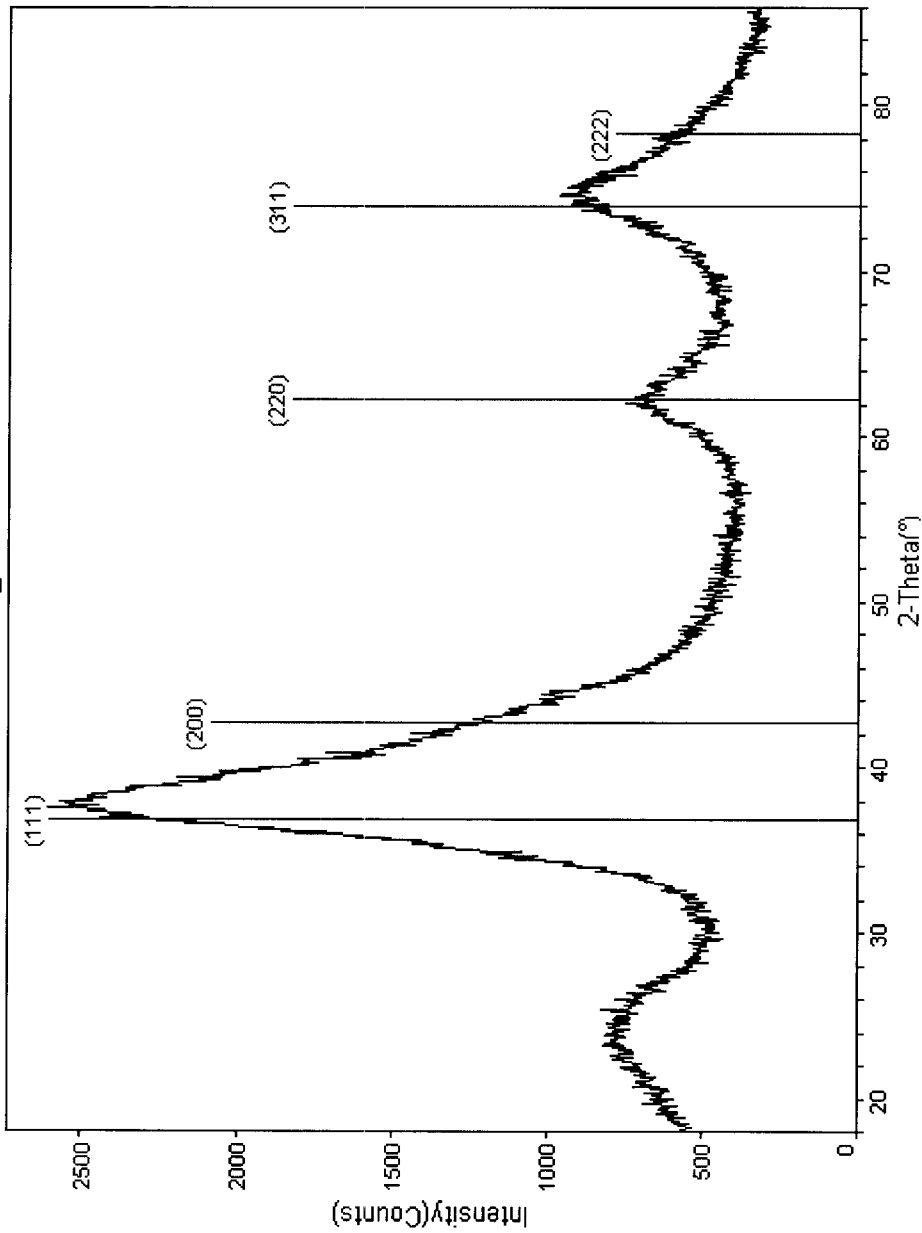
FIG. 2 is the x-ray diffraction pattern of FIG. 1 overlaid with x-ray diffraction lines associated with $W_2(C,O)$.
Figure 3:
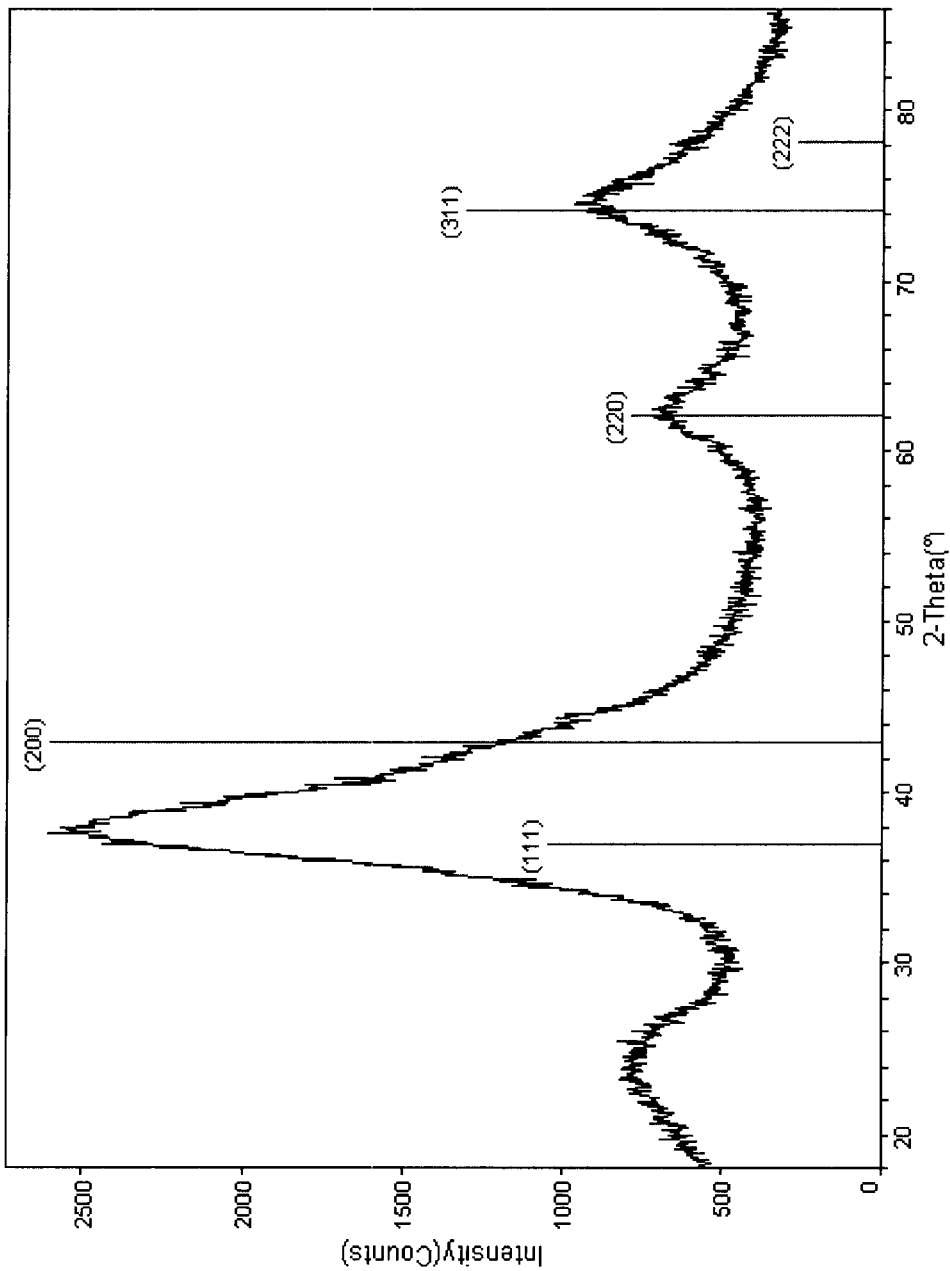
FIG. 3 is the x-ray diffraction pattern of FIG. 1 overlaid with x-ray diffraction lines associated with $WC_{1-x}$.

The peak positions in the XRD pattern indicate a similarity with $W_2(C,O)$ and $WC_{1-x}$. FIGS. 2 and 3 respectively show the XRD line positions and relative intensities for $W_2(C,O)$ and $WC_{1-x}$ superimposed on the diffraction pattern shown in FIG. 1. The data for the $W_2(C,O)$ and $WC_{1-x}$ XRD patterns were obtained from the powder diffraction files maintained by the International Centre for Diffraction Data (PDF#22-0959 and PDF#20-1316). Referring to FIG. 2, it can be seen that the $W_2(C,O)$ line positions while arising near the major peak positions for the tungsten carbide material do not exactly correspond. Furthermore, the relative intensities of the (220) and (311) reflections of $W_2(C,O)$ are not in the same proportion as the two secondary diffraction peaks of the tungsten carbide material. A similar situation exists in FIG. 3. In this case, there appears to be a closer agreement with the $WC_{1-x}$ line positions but there is a major discrepancy in the relative heights. In particular, the most intense line for $WC_{1-x}$ corresponds to the (200) reflection whereas the primary peak in the XRD pattern of the tungsten carbide material is closer to the (111) reflection.

Figure 1:
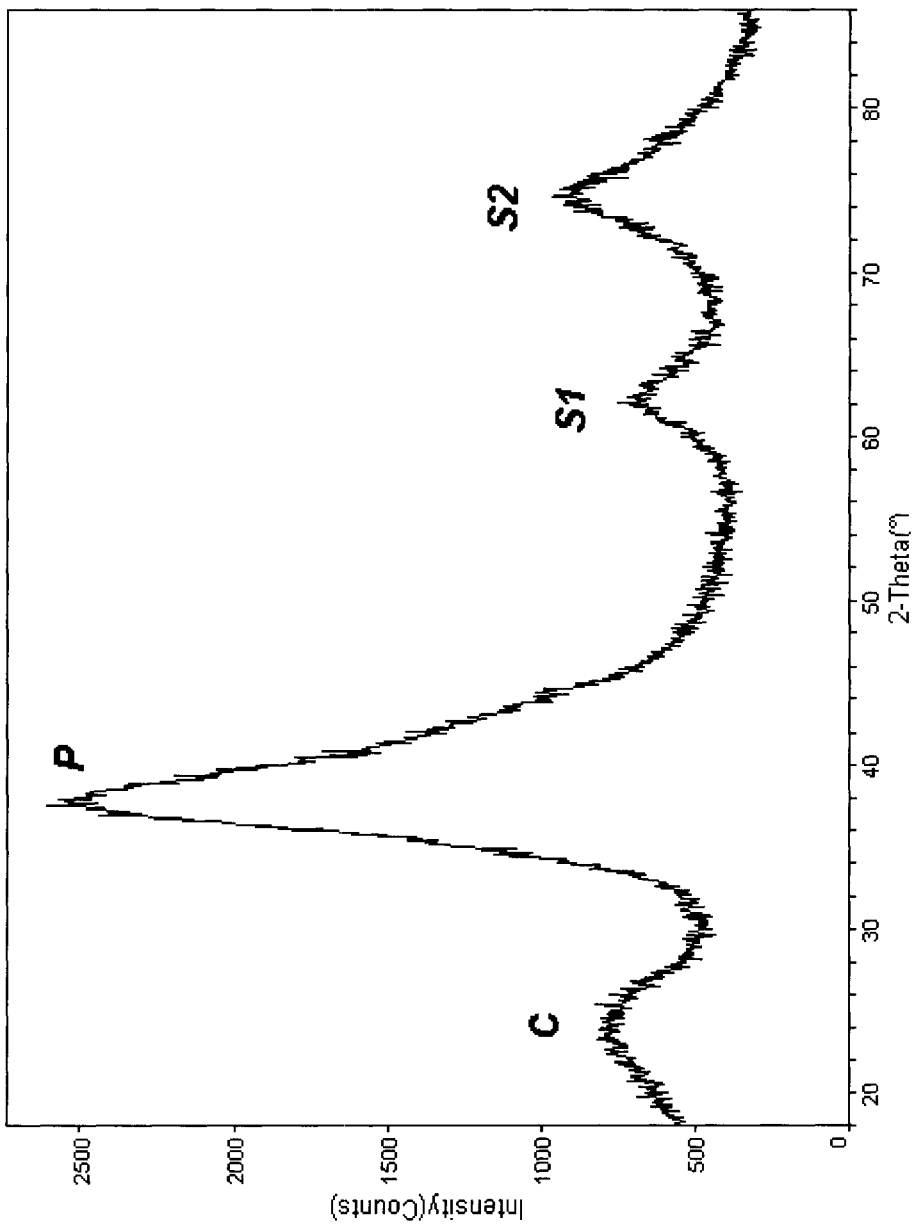
FIG. 1 is an x-ray diffraction pattern of the supported tungsten carbide material of this invention.

With regard to FIG. 1, the XRD pattern of the tungsten carbide material of this invention is characterized by three peaks: a primary peak P and two secondary peaks S1 and S2. It should be noted that the peak positions and the relative peak heights may be affected by the presence of the high-surface-area support underlying the tungsten carbide material. Consequently, the peak positions and relative peak heights discussed herein refer to the tungsten carbide material alone.

The primary peak P in the XRD pattern of the tungsten carbide material occurs at a 2-theta (2θ) angle of 37.6±0.3 degrees. Applying the Bragg equation, this reflection angle corresponds to a d-spacing of about 2.39±0.02 Å. The two secondary peaks S1 and S2 occur at 2θ angles of 62.0±0.3° and 74.8±0.3°. These angles correspond to d-spacings of 1.496±0.007 Å and 1.268±0.005 Å, respectively. The relative peak height of the first secondary peak S1 varies from 25% to 40% of the peak height of the primary peak. The relative peak height of the second secondary peak S2 varies from 35% to 55% of the peak height of the primary peak. The peak height ratio of the first secondary peak S1 to the second secondary peak S2 ranges from 0.65 to 0.80, and preferably from 0.69 to 0.75. As used herein, peak height refers to the maximum intensity of a peak after applying a simple background subtraction.

The tungsten carbide material is formed on a the support by reacting a mixture of a tungsten precursor and a high-surface-area support in flowing hydrocarbon and, optionally, hydrogen gases at a temperature of from about 500° C. to about 800° C. The tungsten precursor material may be ammonium metatungstate $((NH_4)_6H_2W_{12}O_{40} \cdot 5H_2O)$, ammonium paratungstate $((NH_4)_{10}H_2W_{12}O_{42} \cdot 4H_2O$ or $(NH_4)_{10}H_2W_{12}O_{42} \cdot 10H_2O)$, sodium tungstate, tungsten oxides, or ammonium tungstate $((NH_4)_2WO_4)$. Preferably, the tungsten precursor is ammonium paratungstate decahydrate. Suitable hydrocarbon gases include propane, ethane, natural gas, ethylene, acetylene, or combinations thereof. Preferably, the hydrocarbon gas is propane or ethane. Other hydrocarbon gases having molecular formulas containing twelve or less carbon atoms are also believed to useable in the method of this invention. The tungsten precursor is dissolved in aqueous media and slurried with an amount of the support. The slurry is dried and loaded into a ceramic boat which is placed into a tube furnace. An inert atmosphere is established in the tube furnace using flowing argon gas. The furnace is then heated to the reaction temperature and the gas flow is changed to a combination of hydrocarbon and, optionally, hydrogen gases. Once sufficiently reacted, the gas flow is changed back to solely argon gas and the furnace is allowed to cool to room temperature. The tungsten carbide material is then passivated by flowing nitrogen gas through the tube furnace. Preferred flow rates in standard liters per minute (slm) for these gases include: 0.05 slm to 9.5 slm for the hydrocarbon gases, 0 to 2.4 slm for the hydrogen gas, and 0 to 14.2 slm for the argon gas.

Figure 4:
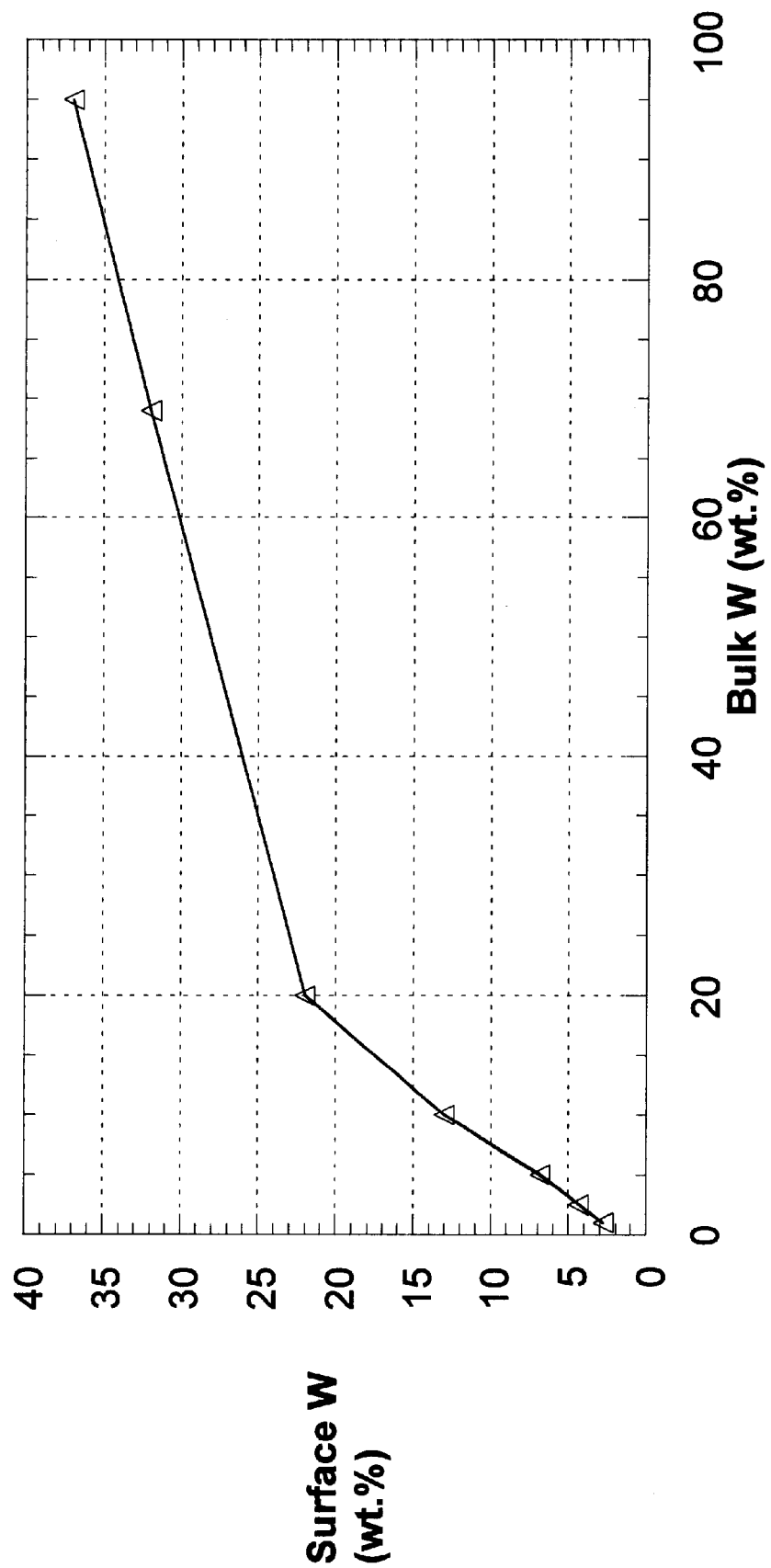
FIG. 4 is a graphical illustration of the wt. % of surface tungsten as a function of the wt. % of bulk tungsten for the supported tungsten carbide material of this invention.

In a preferred embodiment, the above method achieves a uniform dispersion of the tungsten carbide material on a carbon support. This dispersion is characterized by the curve shown in FIG. 4 which represents the weight percent (wt. %) of surface tungsten as a function of the wt. % of the bulk tungsten. The amount of surface tungsten was determined by X-ray Photoelectron Spectroscopy (XPS) also known as ESCA (Electron Spectroscopy for Chemical Analysis). This technique is sensitive to the outermost atomic layers of the surface. The bulk tungsten was calculated by from the initial weights of the reactants. The graph shows that up to 20 wt. % bulk tungsten there is an equivalent amount of surface tungsten. This represents a full utilization of the tungsten carbide material and indicates that a surface coating of the tungsten carbide material is formed rather than the material being trapped in the pores of the support.

Similarly, the tungsten carbide material may also be supported on an alumina substrate (e.g., gamma alumina or pseudo-gamma alumina) by dissolving the tungsten precursor in aqueous media, forming a slurry with a high-surface-area alumina, and then removing the water by conventional drying or spray drying. The dried alumina having a fairly uniform distribution of the tungsten precursor on the surface is then reduced in a hydrocarbon gas stream as described above.

In an alternate method, crystals of ammonium paratungstate are formed on the high-surface-area support and then the APT/support mixture is converted into the supported tungsten carbide material. By forming the crystals directly on the support prior to conversion it is possible to achieve higher tungsten loadings on the support.

The following non-limiting examples are presented. XRD analyses were performed with a Rigaku D/Max X-ray Diffractometer using Cu Kα radiation (40 keV, 30 ma). The Cu Kα contribution in the Cu Kα radiation was removed mathematically from the diffraction patterns. The diffractometer was measured to be accurate to ±0.04° (2θ).

EXAMPLE 1

A 4 g amount of reagent/catalyst grade ammonium metatungstate (AMT) (OSRAM SYLVANIA Products Inc.) on a tungsten basis was mixed with 10 ml of deionized water and 16 grams of activated carbon (Darco brand type KB-B). This mixture was shaken, dried at room temperature, and then dried at 110° C. for about 16 hours. The dried mixture was pulverized in a ball mill to obtain a homogeneous powder and then placed evenly in two ceramic boats. The ceramic boats were loaded into a Lindberg/Blue M model HTF55000 hinged tube furnace utilizing a 2.5 inch diameter quartz tube. An inert atmosphere was established by flowing argon gas through the tube at 0.5 slm. The furnace temperature was raised to 250° C. and the gas flow was changed to a propane flow of 0.2 slm and hydrogen flow of 1 slm. After 1 hour, the temperature was raised to 650° C. After 6 hours, the gas flow was changed back to only argon at 0.5 slm and the furnace turned off. After allowing the material to cool in the furnace under the flowing argon, the material was passivated by passing flowing nitrogen gas through the tube at 1.0 slm for 24 hours. The presence of the tungsten carbide material was confirmed by XRD. The average surface area was 65 m²/g.

EXAMPLE 2

Same as Example 1 except that gamma alumina (Reynolds Metal Co., Grade XRC-SP Gamma 150) was substituted for the activated carbon. The mixture was not ball milled after drying. The presence of the tungsten carbide material was confirmed by XRD.

EXAMPLE 3

A 1.0 kg amount of carbon black (Vulcan XC-72R) was mixed with 828 g of ammonium metatungstate in 18 l of deionized water. The pH of the dissolved AMT solution was adjusted to between 9 and 11 using ammonium hydroxide. An overhead agitator was used to stir the mixture for 1.5 hours. The mixture was allowed to set for 48 to 72 hours until ammonium paratungstate crystals were visible at the solution surface. The solids were then separated from the supernate and dried overnight at 110° C. The dried carbon/APT mixture was then ball milled for 0.5 hours. The carbon/APT mixture was then converted into the supported tungsten carbide material as described in Example 1.

EXAMPLE 4

A 1.0 kg amount of carbon black (Vulcan XC-72R) was mixed with 828 g of ammonium metatungstate in 18 l of deionized water. The pH of the dissolved AMT solution was adjusted to between 9 and 11 using ammonium hydroxide. An overhead agitator was used to stir the mixture for 1.5 hours. The mixture was allowed to set for 48 to 72 hours until ammonium paratungstate crystals were visible at the solution surface. The solids were then separated form the supernate and dried overnight at 110° C. The tungsten loading was measured by X-ray Fluorescence Spectroscopy (XRF) to be 19.8 wt. %. The above steps were repeated using the dried carbon/APT mixture. The tungsten loading of the carbon/APT mixture after the second pass increased to 29.6 wt. %. The dried carbon/APT mixture was then ball milled for 0.5 hours and converted into the supported tungsten carbide material as described in Example 1.

While there has been shown and described what are at the present considered the preferred embodiments of the invention, it will be obvious to those skilled in the art that various changes and modifications may be made therein without departing from the scope of the invention as defined by the appended claims.

We claim:

1. A supported tungsten carbide material comprising a high-surface-support and a tungsten carbide material, the high-surface-area support being comprised of graphite or alumina, the tungsten carbide material being present on the surface of the high-surface-area support, and the supported tungsten carbide material having equivalent amounts in weight percent of surface tungsten and bulk tungsten up to 20 weight percent bulk tungsten.

2. The supported tungsten carbide material of claim 1 wherein the composition of the material is represented by the general formula $WC_{1-x}$ where x is from 0 to 0.5.

3. The supported tungsten carbide material of claim 1 wherein the material has crystallite sizes of about 15 Å to about 30 Å.

4. The supported tungsten carbide material of claim 1 wherein the tungsten carbide material has an x-ray diffraction pattern containing a primary x-ray diffraction peak and first and second secondary x-ray diffraction peaks, the primary x-ray diffraction peak having a reflection angle corresponding to a d-spacing of 2.39±0.02 Å, the first secondary x-ray diffraction peak having a reflection angle corresponding to a d-spacing of 1.496±0.007 Å and a relative peak height of 25% to 40% of the peak height of the primary x-ray diffraction peak, and the second secondary x-ray diffraction peak having a reflection angle corresponding to a d-spacing of 1.268±0.005 Å and a relative peak height of 35% to 55% of the peak height of the primary x-ray diffraction peak.

5. The supported tungsten carbide material of claim 4 wherein the ratio of the peak height of the first secondary x-ray diffraction peak to the peak height of the second secondary x-ray diffraction peak is from 0.65 to 0.80.

6. The supported tungsten carbide material of claim 4 wherein the ratio of the peak height of the first secondary x-ray diffraction peak to the peak height of the second secondary x-ray diffraction peak is from 0.69 to 0.75.

7. The supported tungsten carbide material of claim 4 wherein the composition of the material is represented by the general formula $WC_{1-x}$ where x is from 0 to 0.5.

8. The supported tungsten carbide material of claim 7 wherein the material has crystallite sizes of about 15 Å to about 30 Å.

9. The supported tungsten carbide material of claim 8 wherein the ratio of the peak height of the first secondary x-ray diffraction peak to the peak height of the second secondary x-ray diffraction peak is from 0.65 to 0.80.

10. The supported tungsten carbide material of claim 8 wherein the ratio of the peak height of the first secondary x-ray diffraction peak to the peak height of the second secondary x-ray diffraction peak is from 0.69 to 0.75.

* * * * *